United States Patent [19]
Nakazawa et al.

[11] Patent Number: 5,012,859
[45] Date of Patent: May 7, 1991

[54] AUTOMOTIVE AIR CONDITIONING SYSTEM

[75] Inventors: Takeharu Nakazawa, Tamamura; Toshihiko Fujita, Isesaki, both of Japan

[73] Assignee: Sanden Corporation, Gunma, Japan

[21] Appl. No.: 299,428

[22] Filed: Jan. 23, 1989

[30] Foreign Application Priority Data

Jan. 21, 1988 [JP] Japan ................ 63-5284[U]

[51] Int. Cl.$^5$ .................... F25B 29/00; F14F 11/02
[52] U.S. Cl. .................... 165/42; 165/43;
237/12.3 A; 237/12.3 B; 98/2.08; 98/2.09; 98/2.11
[58] Field of Search ............ 165/42, 43; 237/12.3 B, 237/12.3 A; 98/2.11, 2.09, 2.08

[56] References Cited

U.S. PATENT DOCUMENTS

| | | |
|---|---|---|
| 3,170,509 | 2/1965 | DeRees . |
| 3,934,642 | 1/1976 | Coulson et al. . |
| 3,983,930 | 10/1976 | Franz . |
| 4,223,720 | 9/1980 | Pourier d'Ange d'Orsay et al. . |
| 4,289,195 | 9/1981 | Bellot et al. . |
| 4,379,484 | 4/1983 | Lom et al. . |
| 4,513,808 | 4/1985 | Ito et al. . |
| 4,562,954 | 1/1986 | Kajita . |
| 4,574,873 | 3/1986 | Kawahira et al. . |
| 4,677,902 | 7/1987 | Takemasa . |
| 4,681,153 | 7/1987 | Uchida . |
| 4,779,672 | 10/1988 | Seikou et al. ................. 165/43 |
| 4,815,658 | 3/1989 | Hidemitsu et al. . |
| 4,832,258 | 5/1989 | Hoshino et al. . |
| 4,874,036 | 10/1989 | Masuda . |

FOREIGN PATENT DOCUMENTS

| | | |
|---|---|---|
| 2815012 | 10/1978 | Fed. Rep. of Germany . |
| 56-34514 | 4/1981 | Japan . |
| 57-26010 | 2/1982 | Japan . |
| 57-121914 | 7/1982 | Japan . |
| 57-182514 | 11/1982 | Japan . |
| 57-182515 | 11/1982 | Japan . |
| 58-67512 | 4/1983 | Japan . |
| 60-35619 | 2/1985 | Japan . |
| 2113715 | 6/1985 | Japan .................. 165/43 |
| 60-255522 | 12/1985 | Japan . |
| 61-150815 | 7/1986 | Japan . |
| 61-202916 | 9/1986 | Japan . |
| 59-124428 | 7/1987 | Japan . |
| 62-160913 | 7/1987 | Japan . |

*Primary Examiner*—John Ford
*Attorney, Agent, or Firm*—Banner, Birch, McKie & Beckett

[57] ABSTRACT

An automotive air conditioning system including a folded duct for conveying conditioned air to a passenger compartment, a blower for forcing air through the duct and a partition wall for separating the passenger and engine compartments. The blower is positioned adjacent to one end of the duct which is in fluid communication with an opening formed in the partition wall. The one end of the duct is associated with a shell which covers at least a portion of the blower. The duct has a heater element and an evaporator disposed therein, wherein the evaporator is positioned at a bent portion of the duct. The shell, a portion of the duct and wall adjacent one side of the evaporator form a chamber. An air intake mechanism is associated with the chamber for alternately introducing air, either external to or from the passenger compartment, into the chamber. The air intake mechanism includes a control mechanism which forms part of the chamber and controls the source of air intake.

9 Claims, 3 Drawing Sheets

AUTOMOTIVE AIR CONDITIONING SYSTEM

BACKGROUND OF THE INVENTION

1. Field Of The Invention

The present invention relates to an automotive air conditioning system, and more particularly to an air conditioning system for heating or cooling air.

2. Description Of The Prior Art

FIG. 1 shows a heating system used for use in an automobile. Heating system 10 includes duct 11 for conveying air. Heater element 12 is disposed in duct 11. One end of duct 11 opens into and is in fluid communication with opening 131 which is formed in partition wall 13. Partition wall 13 separates passenger compartment 14 and engine compartment 15. Air blower 16 is positioned adjacent to opening 131 and the one end of duct 11 for forcing air therethrough. First, second and third through passageways 111, 112 and 113 are formed at another end of duct 11. Passages 111, 112 and 113 direct air toward the automobile windshield, passenger compartment foot space and a central region of the passenger compartment, respectively.

Among the drawbacks of such automotive heating systems are the difficulties in installing a substitute or an additional system for cooling the air, or in converting the automotive heating system to a system which may heat or cool the air. For example, it may be necessary to form an additional opening in the partition wall. Furthermore, the limited amount of available space in the passenger and engine compartments restricts mounting arrangements.

SUMMARY OF THE INVENTION

In view of the above and other deficiencies of the known prior art, it is an object of the present invention to provide a compact air conditioning system which may readily replace an automotive heating system without extending beyond the limited free space in the passenger and engine compartments, and without interfering with passenger comfort or engine parts.

It is another object of the present invention to provide an air conditioning system which may readily replace an automotive heating system without requiring an additional opening to be formed in the partition wall which separates the passenger and engine compartments.

Thus, the present invention involves an automotive air conditioning system including a folded duct for conveying conditioned air to a passenger compartment, a blower for forcing air through the duct and a partition wall for separating the passenger and engine compartments. The blower is positioned adjacent to one end of the duct which is in fluid communication with an opening formed in the partition wall. The one end of the duct is associated with a shell which covers at least a portion of the blower. The duct has a heater element and an evaporator disposed therein, wherein the evaporator is positioned at a bent portion of the duct. The shell, a portion of the duct and a wall adjacent one side of the evaporator form a chamber. An air intake mechanism is associated with the chamber for alternately introducing air, either external to or from the passenger compartment, into the chamber. The air intake mechanism includes a control mechanism which forms part of the chamber and controls the source of air intake.

DETAILED DESCRIPTION OF THE PREFERRED EMBODIMENT

Figure 1:
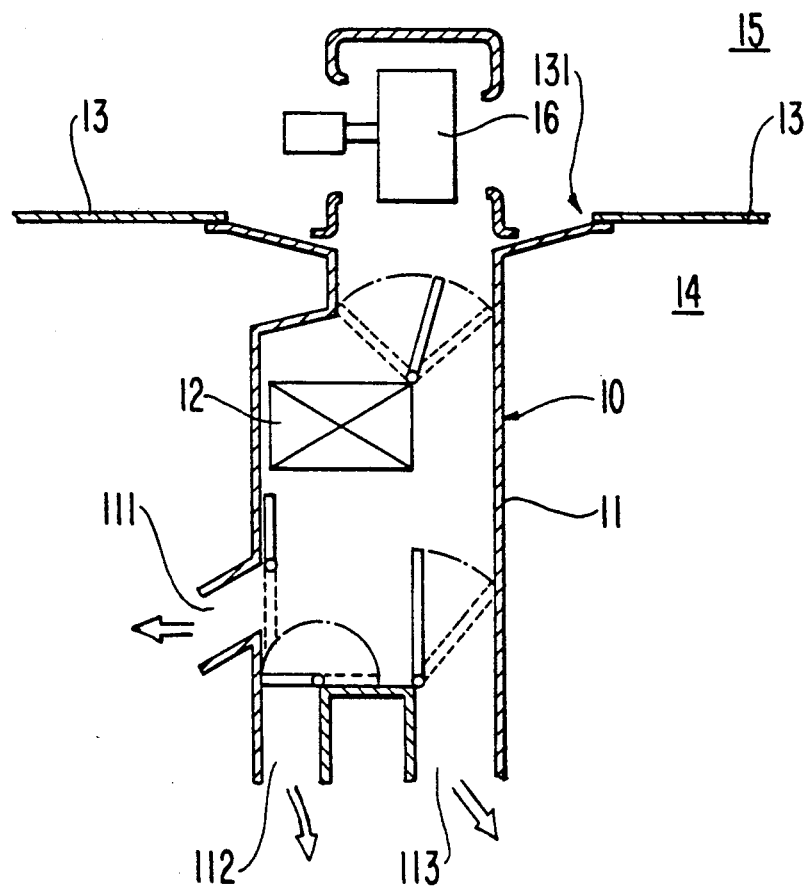
FIG. 1 is a schematic sectional view of a heating system for an automobile.
Figure 2:
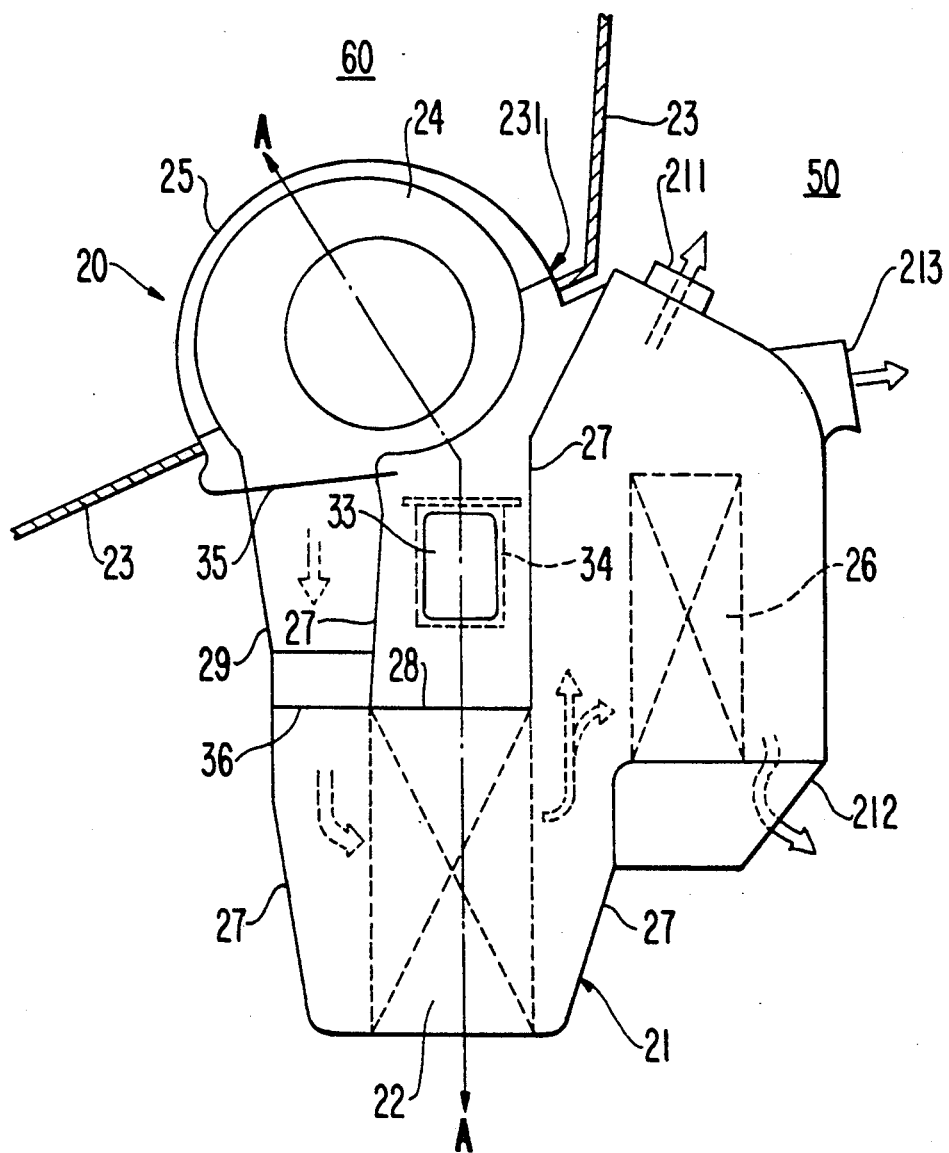
FIG. 2 is a schematic side view of an automotive air conditioning system in accordance with a preferred embodiment of this invention.
Figure 3:
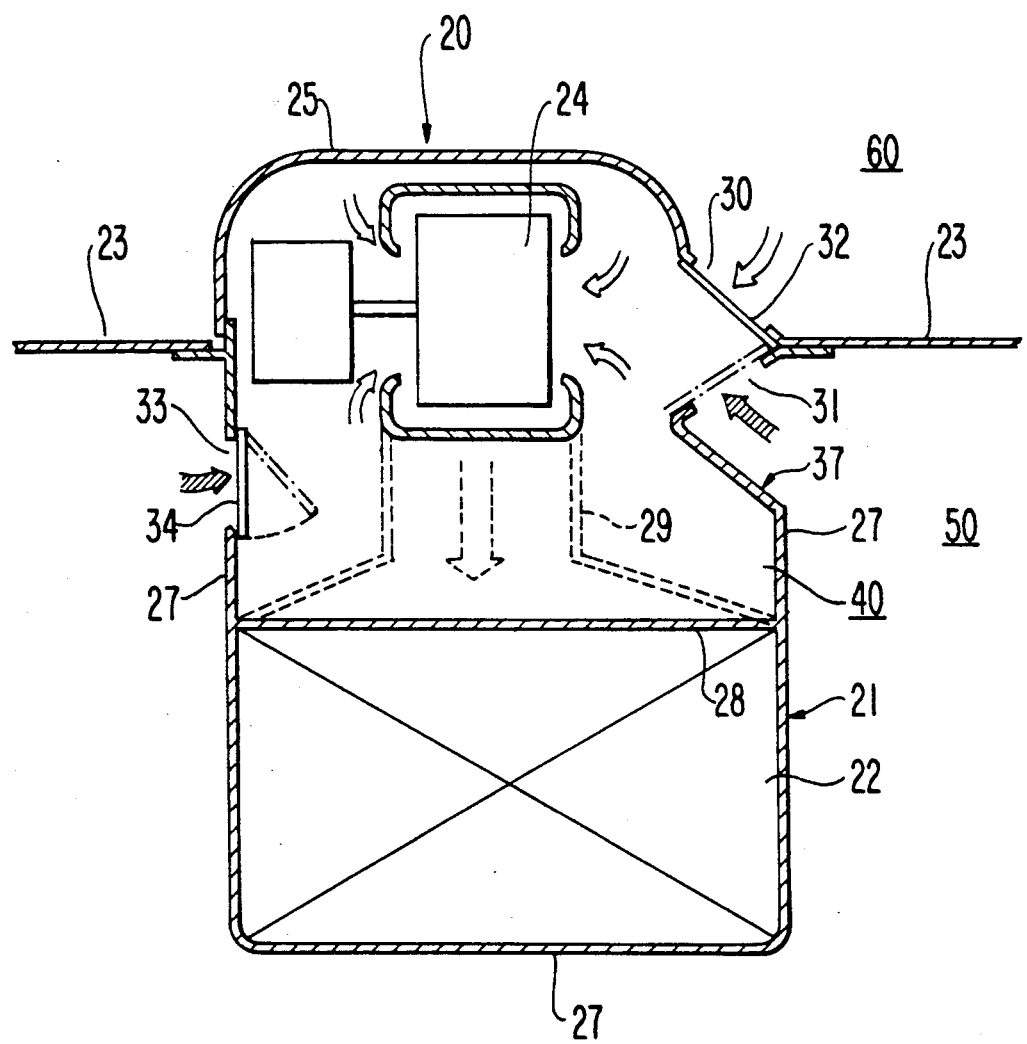
FIG. 3 is a fragmentary schematic sectional view taken along line A—A in FIG. 2.

Referring to the drawings in detail, wherein like numerals indicate like elements, FIGS. 2 and 3 shown an automotive air conditioning system in accordance with a preferred embodiment of the invention.

Automotive air conditioning system 20 includes duct 21 for conveying air. Duct 21 is folded and has evaporator 22 disposed therein at a bent portion thereof. One end of duct 21, upstream from another end of duct 21, is associated and in fluid communication with opening 231 formed in partition wall 23. Partition wall 23 separates passenger compartment 50 and engine compartment 60. Air blower 24 is positioned adjacent to the one or upstream end of duct 21 for forcing air through an opening at the one or upstream end, through duct 21 and then into passenger compartment 50. Cover member or shell 25, which may be cup-shaped, is associated with the one upstream end of duct 21 and covers at least a portion of blower 24. Heater element 26 is disposed within a portion of duct 21 downstream from evaporator 22. First, second and third through passages 211, 212 and 213 are formed at the other or downstream end of duct 21 for directing air toward various regions within the passenger compartment. Passages 211, 212 and 213 direct air toward the automobile windshield (not shown), the passenger compartment foot space and the central region of the passenger compartment, respectively.

Cover member 25, wall 27 of duct 21 and wall 28 form chamber 40. Wall 28 is disposed upon or adjacent to one end or side of evaporator 22. Cover member 25 is provided with outlet port 35 from which air from blower 24 may pass into linking duct 29. Duct 29 links outlet port 35 to inlet port 36 of duct 21. Inlet port 36 may be formed on wall 27 of duct 21.

Outside air intake port 30 and passenger compartment air intake port 31 are alternately opened and closed by a control mechanism such as damper 32 which alternately opens and closes ports 30 and 31 thereby controlling air intake selection. Ports 30 and 31 preferably are positioned adjacent partition wall 23 and on opposite sides thereof. Ports 30 and 31 also are shown as being positioned between cover 25 and shell portion 37 of chamber 40. Additional passenger compartment air intake port 33 is provided on a side of chamber 40 opposite port 31 and shell portion 37, and is opened and closed by a control mechanism such as dead load type damper 34. Additional intake port 33 provides supplemental air intake from the passenger compartment air for conveyance thereof through duct 21.

When air blower 24 is operated, while damper 32 is pivoted or positioned to close outside air intake port 30, passenger compartment air intake port 31 is open. Such damper control is especially suitable for air conditioning during hot ambient conditions, such as those common to summer, so that worked on passenger compartment air may be recirculated through passenger compartment air intake port 31 and through duct 21. Furthermore, when air speed within duct 21 exceeds a predetermined value, such as when the speed of blower 24 is increased to a certain degree, additional passenger compartment air intake port 33 is opened so that additional passenger compartment air is taken into duct 21 through port 33. More particularly, damper 34 may pivot according to pressure differentials. For example, increased air speed may reduce the pressure on the side of damper 34 within chamber 40 to pivot damper 34 to an open position. Accordingly, the increased air flow rate increases the effective cooling rate in passenger compartment 50 due to an increased amount of passenger compartment air circulating through the air conditioning system.

On the other hand, when air blower 24 is operated while damper 32 is pivoted or positioned to close passenger compartment air intake port 31, outside air intake port 30 is open. Such damper control is especially suitable for air conditioning during cold ambient conditions such as those common to winter, so that fresh outside air may be taken into duct 21 through outside air intake port 30. As above, when the air speed within duct 21 exceeds a predetermined value, additional passenger compartment air intake port 33 is opened so that additional passenger compartment air is taken into duct 21 through port 33. Accordingly, the heating efficiencies in heating passenger compartment 50 increase.

Alternatively, when the automobile is moving, the ram pressure of the air may be sufficient to ventilate passenger compartment 50 without assistance from air blower 24. In this instance, blower 24 is turned off and outside air intake port 30 is opened. Additional passenger compartment air intake port 33 remains closed due to the positive pressure in duct 21. Therefore, only fresh outside air is taken into duct 21 through outside air intake port 30.

This invention has been described in detail in connection with the preferred embodiment. This embodiment, however, is merely for example only and the invention is not restricted thereto. It will be understood by those skilled in the art that other variations and modifications can easily be made within the scope of this invention as defined by the claims.

We claim:

1. In an automotive air conditioning system comprising a duct for conveying conditioned air to a passenger compartment, a blower for forcing air through said duct and a partition wall for separating said passenger compartment from an engine compartment, said blower being positioned adjacent to one end of said duct which is in fluid communication with an opening formed in said partition wall, said duct having a heater element disposed therein, the improvement comprising:

an evaporator being positioned in said duct;
a shell which covers at least a portion of said blower and which is associated with said one end of said duct;
a chamber, wherein said shell, a portion of said duct and a wall adjacent one side of the evaporator substantially form the boundaries of said chamber and said blower is in fluid communication with the interior of said chamber; and
air intake means associated with said chamber for alternately introducing air, either external to or from said passenger compartment, into said chamber, said air intake means comprising.
an outside air intake port disposed on one side of said partition wall and a passenger compartment air intake port disposed on the other side of said partition wall, each port communicating with said chamber,
at least one additional passenger compartment air intake port associated with said chamber to provide fluid communication between said passenger compartment and said chamber, and
control means forming part of the wall of said chamber for selectively controlling the source of air intake, said control means comprising
a damper mounted on said partition wall adjustably positioned over either of said outside air intake port and said passenger compartment air intake port, and
at least one damper for opening and closing said at least one additional passenger compartment air intake port,
wherein said blower forces said air introduced into said chamber into said duct.

2. The automotive air conditioning system of claim 1 wherein said at least one damper for said at least one additional passenger compartment air intake port comprises a dead load type damper.

3. The automotive air conditioning system of claim 1 wherein said at least one damper comprises pivoting means for permitting said at least one damper to pivot toward or away from said at least one additional passenger compartment air intake port in response to air speed adjacent one side of said at least one damper.

4. The automotive air conditioning system of claim 1 further comprising another duct in fluid communication with and disposed between said blower and said duct, said at least one damper being positioned adjacent said another duct.

5. The automotive air conditioning system of claim 1 wherein said at least one additional passenger compartment air intake port is disposed on an opposite side of said chamber from said outside and passenger compartment air intake ports.

6. The automotive air conditioning system of claim 1 further comprising another duct in fluid communication with and disposed between said blower and said duct.

7. In an automotive air conditioning system comprising a duct for conveying conditioned air to a passenger compartment, a blower for forcing air through said duct and a partition wall for separating said passenger compartment from an engine compartment, said blower being positioned adjacent to one end of said duct which is in fluid communication with an opening formed in said partition wall, said duct having a heater element disposed therein, the improvement comprising:

an evaporator being positioned in said duct;
a shell which covers at least a portion of said blower and which is associated with said one end of said duct;
a chamber, wherein said shell, a portion of said duct and a wall adjacent one side of the evaporator substantially form the boundaries of said chamber and said blower is in fluid communication with the interior of said chamber:
an outside air intake port disposed on one side of said partition wall and a passenger compartment air intake port disposed on the other side of said partition wall, each port communicating with said chamber; a damper mounted on said partition wall, said damper adjustably mounted to open and close either of said outside air intake port and said passenger compartment air intake port;

at least one additional passenger compartment air intake port associated with said chamber; and an additional damper pivotally mounted adjacent said additional air intake port to open or close the same.

8. An automotive air conditioning system comprising:

a U-shaped duct for conveying conditioned air to a passenger compartment, one end of said duct being in fluid communication with an opening formed in a partition wall, said partition wall separating said passenger compartment from an engine compartment;

a blower for forcing air through said duct, said blower being positioned adjacent to said one end of said duct and in fluid communication with said one end of said duct through said opening formed in said partition wall;

an evaporator disposed in said duct and being positioned at a bent portion of said duct;

a heater element disposed in said duct, said evaporator being interposed between said one end of said duct and said heater element;

means forming a chamber, wherein said blower is in fluid communication with the interior of said chamber;

a cover member which covers at least a portion of said blower and which is associated with said one end of said duct, said cover member forming a portion of the boundary of said chamber;

an outside air intake port disposed on one side of said partition wall and a passenger compartment air intake port disposed on the the other side of said partition wall, each port being in fluid communication with the interior of said chamber; a damper mounted on said partition wall, said damper adjustably mounted to open and close either of said outside air intake port and said passenger compartment air intake port:

at least one additional passenger compartment air intake port which is in fluid communication with the interior of said chamber to provide supplemental air intake for said blower; and at least one damper for opening and closing said at least one additional passenger intake port.

9. The automotive air conditioning system of claim 8, wherein said at least one damper comprises pivoting means for permitting said at least one damper to pivot toward or away from said at least one additional passenger compartment air intake port in response to air speed within said duct adjacent one side of said at least one damper, such that when the speed of said blower is increased to a certain degree, said additional passenger compartment air intake port is opened so that additional passenger compartment air is taken into said duct through said additional passenger compartment air intake port.

* * * * *